Oct. 17, 1961  D. W. YOUNG  3,005,016
ISOOCTENYL 2,4-DICHLOROPHENOXYACETATE
Filed June 1, 1959
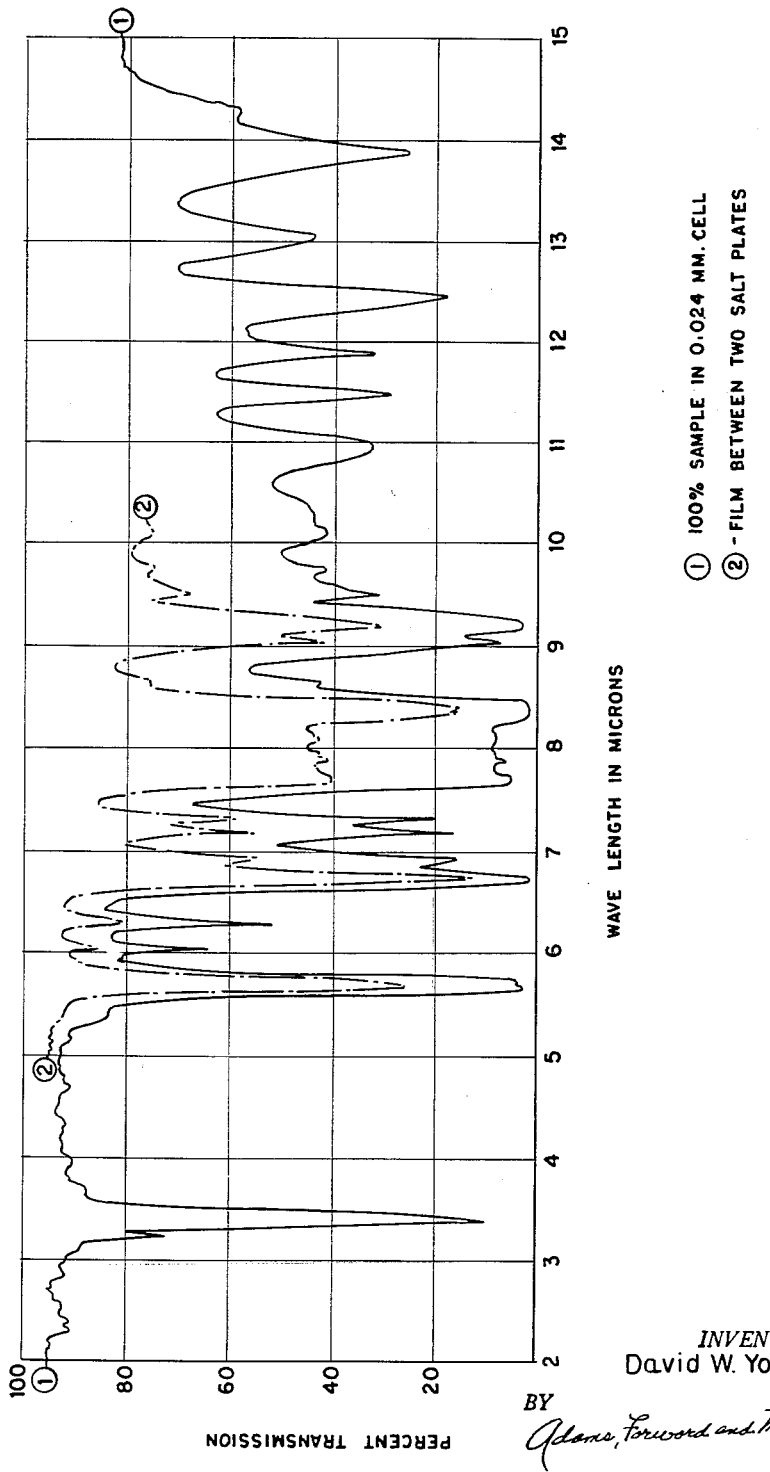
INVENTOR.
David W. Young
BY
Adams, Forward and McLean
ATTORNEYS

United States Patent Office 3,005,016
Patented Oct. 17, 1961

3,005,016
ISOOCTENYL 2,4-DICHLOROPHENOXYACETATE
David W. Young, Homewood, Ill., assignor to Sinclair Refining Company, New York, N.Y., a corporation of Maine
Filed June 1, 1959, Ser. No. 817,380
1 Claim. (Cl. 260—473)

My invention relates to a novel composition of matter, the ester of isooctenyl alcohol and 2,4-dichlorophenoxyacetic acid, and its use as a herbicide.

Esters of 2,4-dichlorophenoxyacetic acid (2,4-D) are known to have value as herbicidal agents for weed and brush control. The common esters (ethyl, propyl, and butyl) have a high potency, but their use is accompanied by a severe drawback, their tendency to drift.

Drifting is a phenomenon which is associated with volatility and, in the case of weed killers, is the tendency of a composition to wander from the plot of ground to which it is applied over to neighboring fields. Certain crops, notably cotton, are extremely susceptible to 2,4-dichlorophenoxyacetic acid and its derivatives, and can be severely damaged by vapors of the weed killer which may drift from fields which are planted with crops tolerant to the weed killer, such as rice. Because of the high volatility of most of the available esterified forms of 2,4-D, the residual activity of the herbicide suffers, and weed control is not as long lasting as would be desirable.

I have found that the novel ester of isooctenyl alcohol and 2,4-dichlorophenoxyacetic acid possesses good herbicidal activity and is of the low volatile, no drift type. Surprisingly, the ester is less toxic in vapor drift than similar esters of the low volatile type, e.g. saturated branched chain alcohol esters of the same number of carbon atoms. The novel ester possesses all the desirable characteristics of a useful herbicide. It is of low volatility, forms emulsifiable concentrates, is soluble in low cost aromatic solvents, is highly selective in herbicidal activity and has good herbicidal activity.

The isooctenyl alcohol useful in preparing the esters of my invention can be represented by the general formula

wherein R is branched alkenyl of 4 carbon atoms, e.g.

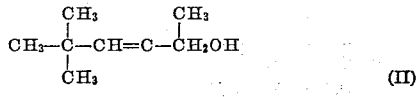

and

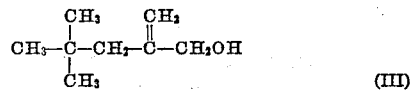

The isooctenyl alcohol used can comprise a mixture of alcohols such as those of Formulas II and III.

The isooctenyl alcohol can be conveniently prepared by the hydrolysis of the corresponding chloride which in turn can be prepared by chlorinating diisobutylene. Isooctenyl chlorides can be prepared, for example, by the liquid phase chlorination of diisobutylene with chlorine, e.g. at about 90 to 110° C., with removal of evolved hydrogen chloride, as described in U.S. Patent 2,783,285 to Chambers and Foster or by the vapor phase chlorination of diisobutylene with chlorine, e.g. at about 100 to 200° C., using a substantial stoichiometric excess of diisobutylene as described in U.S. Patent 2,785,207 to Chambers and Foster. Such isooctenyl chlorine can be hydrolyzed to isooctenyl alcohol, for example, by hydrolysis in aqueous alkaline medium, e.g. at about 100° C. to carbonization temperature, as described in pending applications S.N. 347,222, filed April 7, 1953, and S.N. 412,633, filed February 25, 1954, of Chambers and Foster.

The novel ester can be prepared by conventional esterification techniques. Advantageously, the esterification is carried out by dissolving 2,4-dichlorophenoxyacetic acid in an inert organic solvent, e.g. toluene, adding the isooctenyl alcohol to the solution, heating the mixture in the presence of an esterification catalyst and recovering the ester. Zinc stearate is the preferred catalyst. Catalysts such as p-toluene sulfonic acid and titanium tetrachloride are not useful in the esterification as they add to the double bond of the alcohol and produce side polymerization.

The novel ester is a liquid and can be used as a herbicide in the same manner as the known esters of 2,4-D and at the same concentrations as 2,4-D and its known esters. For use as a herbicide, the ester can be formulated with conventional herbicidal carriers. Advantageously, the ester is used as a spray. As sprays, the ester can be formulated as concentrates in conventionally used oils, e.g. a horticultural spray oil such as a paraffinic white oil of 400–600° F. boiling range, diesel oil, or kerosene, and liquid aromatic solvents; e.g. xylene or methyl naphthalenes, and applied as such or as emulsions in water. In such concentrates, the amount of the ester can vary widely but generally is about 10 to 30%, preferably about 15%, and the resulting solution can be diluted with water for use, for example, at about 1 fluid ounce per gallon of water. Also, the ester can be emulsified in water and sprayed as such. In the solutions or emulsions, conventional agents can be employed to insure good emulsification and good contact with the foliage of treated vegetation. Typical satisfactory conventional agents for wetting, dispersion and emulsification include the alkylaryl sulfonates, the fatty alcohol sulfates, sodium salts of naphthalene sulfonic acid, long chain quaternary ammonium compounds and sodium salts of petroleum-derived alkylsulfonic acids. The herbicidal compositions containing the ester are effective and can be used in concentrations of from about 2 to 150 pounds per 100 gallons of finished spray per acre.

The novel ester can also be used as a dust by impregnation on a solid carrier, e.g. lime, talc, bentonite, pyrophyllite and calcium carbonate. The finely-divided solid containing the ester, e.g. in a concentration of about 10 to 30 weight percent, is then applied to the vegetation. Also, the ester can be impregnated on a clay, e.g. in a concentration of about 10 to 30 weight percent, and formed into pellets and utilized in this form to destroy or control algae and aquatic weeds, e.g. lilies, cattails, alligator weeds, elodea, milfoil, fanwart, tape grass and ludwigia, by dropping the pellets into the water containing the weeds. Also, the ester can be incorporated into grease-like formulations to permit brushing or daubing of the herbicidal ester onto specific weeds or plants. The grease-like formulations can be obtained by dispersing the ester with a conventional thickener in a hydrocarbon oil base or synthetic ester base to form an adhesive grease. Concentrations of about 0.5 to 10 weight percent of the ester based on the oil base can be used.

The herbicidal compositions containing the novel ester can also include other ingredients such as other herbicides.

The novel ester is herbicidally effective against the same weeds and plants as 2,4-D and its known esters, e.g. dandelion, plantains, poison ivy, poison oak, ragweed, docks, chickweed, thistles and mustards.

My invention will be further illustrated by the following examples.

EXAMPLE 1

*Preparation of isooctenyl ester of 2,4-dichlorophenoxyacetic acid*

2,4-dichlorophenoxyacetic acid (1 mole) was added to 250 ml. of toluene in a flask. To this was added 1.05 moles of isooctenyl alcohol. To this mixture was added 0.5% zinc stearate (calculated on weight of acetic ester making products) as catalyst. The mixture was heated under reflux conditions for 9½ hours with a water condenser on top and azeotrope side trap. By-product water (0.96 mole) was removed as the reaction was conducted. The product in the flask was cooled, removed, 20 grams of Hyflow added, filtered through paper under vacuum, and toluene removed by heating the ester under vacuum to 130–140° C. at 20 to 40 mm. Hg.

The isooctenyl ester of 2,4-dichlorophenoxyacetic acid product had the following properties:

Viscosity, centistokes:
  At 100 °F _____ 26.02
  At 210° F _____ 3.039
Density, 20/4 _____ 1.1650

$C_{16}H_{22}O_3Cl_2$, calcd: C, 58.00; H, 6.65; Cl, 21.4. Found: C, 58.38; H, 6.18; Cl, 20.8.

The infrared spectra of the isooctenyl ester of 2,4-dichlorophenoxyacetic acid product (as determined with a model 21 Perkins-Elmer infrared spectrometer) are illustrated in the accompanying drawing which is a reproduction of the infrared curves obtained with (1) a 100% sample (liquid) in a 0.024 mm. cell and (2) a film (liquid) between two salt plates.

The spectrum of the sample of the isooctenyl ester of 2,4-dichlorophenoxyacetic acid was analyzed employing the accepted correlations for infrared absorption band position and chemical structure. The spectrum clearly shows the presence of an ester group. This is indicated by the carbonyl band at 5.8 microns and the carbon-oxygen stretching vibration at 8.4 microns. The carbon-carbon double bond of the isooctenyl group is observed as a strong sharp absorption band at 6.06 microns. The band at 6.3 microns is characteristic of aromatics. The 7.1–7.4 micron region of the spectrum indicates the presence of two methyl groups on a common tertiary carbon located in the isooctenyl group.

The absorption bands in the long wave length region of the spectrum (11–15 microns) clearly indicate the presence of 1,2,4-trisubstituted aromatics. The bands in this region are comparable with those found in a reference spectrum of 2,4-dichlorophenoxyacetic acid (Sadtler standard spectra #1583CA) as would be expected. The absorption band at 13.08 microns is probably due to an impurity of the ester of 2,4,5-trichlorophenoxyacetic acid.

EXAMPLE 2

Vapor toxicity of various herbicidal esters of 2,4-D was determined. Pregerminated cucumber seeds, a susceptible crop, were used as test specimens. The seeds were sealed in polyethylene bags containing sufficient moisture for normal growth and a predetermined quantity (3.36 g.) of the ester on filter paper. The test specimens were maintained at 70 to 80° F. for 72 hours and the root elongation determined at the end of this time. The results are recorded in table form below:

| Ester: | Average root length, mm. |
|---|---|
| Isopropyl 2,4-D | 9 |
| Decyl 2,4-D | 26 |
| Isooctyl 2,4-D | 28 |
| Butoxyethyl 2,4-D | 31 |
| Tridecyl 2,4-D | 38 |
| Control | 52 |
| Isooctenyl 2,4-D | 37 |

These data show that the isooctenyl alcohol 2,4-D ester has lower vapor-toxicity than most of the other low-volatile esters and in particular have less vapor toxicity at the same carbon number than the saturated chain alcohol ester, i.e. the isooctyl alcohol ester.

EXAMPLE 3

In this study the rate of application was constant at a concentration of 4 ounces per gallon. The amount of ester-water solution or emulsion used was the amount to wet the weed or woody plant in a grass plot. The percent of weed kill is indicated in the table. The area treated was 100 sq. ft. in each study.

| | Percent kill |
|---|---|
| Butoxyethyl 2,4-D | 67 |
| Isooctyl 2,4-D | 54 |
| 2-ethylhexy 2,4-D | 52 |
| Isooctenyl 2,4-D | 63 |

The above results show that the isooctenyl 2,4-D ester effectively kills weeds in a grass plot. Observation on flowers, etc. show less vapor toxic drift kill or blight for icooctenyl 2,4-D than for butoxyethyl 2,4-D.

EXAMPLE 4

A herbicidal concentrate is prepared by dissolving 14 parts by weight of isooctenyl ester of 2,4-D in 86 parts by weight of kerosene. The concentrate can be sprayed as such on weeds or plants or diluted with water for use as a spray at 1 fluid ounce of concentrate per gallon of water.

EXAMPLE 5

An emulsifiable concentrate suitable for use when diluted with 50 parts by weight of water per part of concentrate is composed of 1 part by weight of the isooctenyl ester of 2,4-D and 10 parts by weight of sodium dodecylbenzene sulfonate.

EXAMPLE 6

A composition suitable for use as a dust is composed of finely-divided bentonite on which has been impregnated 14 percent by weight of isooctenyl ester of 2,4-D.

I claim:

Isooctenyl alcohol ester of 2,4-dichlorophenoxyacetic acid.

References Cited in the file of this patent

UNITED STATES PATENTS

| 2,396,513 | Jones | Mar. 12, 1946 |
|---|---|---|
| 2,754,188 | Yowell et al. | July 10, 1956 |